(12) United States Patent
Joshi et al.

(10) Patent No.: US 9,797,053 B2
(45) Date of Patent: Oct. 24, 2017

(54) COMPOSITE ALKALI ION CONDUCTIVE SOLID ELECTROLYTE

(71) Applicant: Ceramatec, Inc., Salt Lake City, UT (US)

(72) Inventors: Ashok V Joshi, Salt Lake City, UT (US); Sai Bhavaraju, West Jordan, UT (US)

(73) Assignee: FIELD UPGRADING U.S.A., INC., Golden, CO (US)

( * ) Notice: Subject to any disclaimer, the term of this patent is extended or adjusted under 35 U.S.C. 154(b) by 806 days.

(21) Appl. No.: 13/742,184

(22) Filed: Jan. 15, 2013

(65) Prior Publication Data
US 2013/0183546 A1 Jul. 18, 2013

Related U.S. Application Data

(60) Provisional application No. 61/587,044, filed on Jan. 16, 2012.

(51) Int. Cl.
*H01M 10/0562* (2010.01)
*H01M 6/18* (2006.01)
(Continued)

(52) U.S. Cl.
CPC ............ *C25B 13/04* (2013.01); *H01M 6/185* (2013.01); *H01M 10/052* (2013.01); *H01M 10/0562* (2013.01); *H01M 8/1016* (2013.01)

(58) Field of Classification Search
USPC .......................... 429/101, 104–105, 321–322
See application file for complete search history.

(56) References Cited

U.S. PATENT DOCUMENTS 4,026,725 A * 5/1977 Sutula ................... H01M 6/36
429/103
4,213,833 A 7/1980 Lefevre
(Continued)

FOREIGN PATENT DOCUMENTS

WO WO9627697 9/1996

OTHER PUBLICATIONS

Hammerstein, G. "European Search Report", European Patent Application No. 13738140.6, (Jul. 3, 2015),1-6.
(Continued)

*Primary Examiner* — Osei Amponsah
(74) *Attorney, Agent, or Firm* — Paul S. Cha

(57) ABSTRACT

An electrochemical cell having a composite alkali ion-conductive electrolyte membrane. Generally, the cell includes a catholyte compartment and an anolyte compartment that are separated by the composite alkali ion-conductive electrolyte membrane. The composite electrolyte membrane includes a layer of alkali ion-conductive material and one or more layers of alkali intercalation compound which is chemically stable upon exposure to a chemically reactive anolyte solution or catholyte solution thereby protecting the layer of alkali ion-conductive material from unwanted chemical reaction. The layer of alkali intercalation compound conducts alkali ions. The cell may operate and protect the alkali ion-conductive material under conditions that would be adverse to the material if the intercalation compound were not present. The composite membrane may include a cation conductor layer having additional capability to protect the composite electrolyte membrane from adverse conditions.

12 Claims, 5 Drawing Sheets

(51) Int. Cl.
*H01M 8/10* (2016.01)
*C25B 13/04* (2006.01)
*H01M 10/052* (2010.01)
*H01M 8/1016* (2016.01)

(56) References Cited

U.S. PATENT DOCUMENTS

| | | | |
|---|---|---|---|
| 5,290,405 A | 3/1994 | Joshi et al. | |
| 5,580,430 A | 12/1996 | Balagopal et al. | |
| 5,968,326 A | 10/1999 | Yelon et al. | |
| 6,770,187 B1 | 8/2004 | Putter et al. | |
| 6,949,285 B1* | 9/2005 | Tobinaga | B01D 69/148 |
| | | | 428/317.9 |
| 7,618,527 B2 | 11/2009 | Schussler et al. | |
| 8,038,865 B2 | 10/2011 | Schussler | |
| 2009/0189567 A1* | 7/2009 | Joshi | C04B 35/447 |
| | | | 320/127 |
| 2010/0068629 A1* | 3/2010 | Gordon | H01M 4/06 |
| | | | 429/325 |
| 2012/0085658 A1 | 4/2012 | Bhavaraju et al. | |
| 2012/0171562 A1* | 7/2012 | Narula | B82Y 30/00 |
| | | | 429/189 |
| 2012/0251871 A1* | 10/2012 | Suzuki | H01M 10/0562 |
| | | | 429/158 |

OTHER PUBLICATIONS

Bommaraju, et al., "Brine Electrolysis", *Electrochemistry Encyclopedia* (available at http://electrochem.cwru.edu/encycl/art-b01-brine.htm), (Nov. 2001),1-17.

Lee, Dong W., "International Search Report", PCT/US2013/021587 (corresponding to U.S. Appl. No. 13/742,184), (Apr. 29, 2013),1-3.

Lee, Dong W., "Written Opinion of the International Searching Authority", PCT/US2013/021587 (corresponding to U.S. Appl. No. 13/742,184), (Apr. 29, 2013),1-7.

* cited by examiner

COMPOSITE ALKALI ION CONDUCTIVE SOLID ELECTROLYTE

CROSS-REFERENCE TO RELATED APPLICATIONS

This application claims the benefit of U.S. Provisional Application No. 61/587,044, filed Jan. 16, 2012, entitled "Composite Solid Electrolyte for Electrolysis of Acid Anolyte" the entire disclosure of which is hereby incorporated by reference.

FIELD OF THE INVENTION

The present invention relates in general to electrochemical cells comprising a composite alkali ion-conductive electrolyte membrane. More particularly, the present invention relates to systems and methods for operating an electrochemical cell in acidic conditions, basic conditions, some chemically reactive neutral conditions, or conditions involving organic solutions.

BACKGROUND OF THE INVENTION

Electrochemical cells comprising ceramic membranes that selectively transport ions are known in the art. By having an ion-selective membrane in the electrochemical cell, certain ions are allowed to pass between the cell's anolyte compartment and catholyte compartment while other chemicals are maintained in their original compartments. Thus, through the use of an ion-specific membrane, an electrochemical cell can be engineered to be more efficient and to produce different chemical reactions than would otherwise occur without the membrane.

These ion-selective membranes can be selective to either anions or cations. Moreover, some cation-selective membranes are capable of selectively transporting alkali cations. By way of example, NaSICON (Na Super Ion CONducting) membranes selectively transport sodium cations, while LiSICON (Li Super Ion CONducting) and KSICON (K Super Ion CONducting) membranes selectively transport lithium and potassium cations, respectively.

One example of a conventional electrochemical cell is illustrated in FIG. 1. Specifically, FIG. 1 illustrates an electrolytic cell 110 that comprises an anolyte compartment 112 and a catholyte compartment 114 that are separated by a NaSICON membrane 116.

Under some conventional methods, as the cell 110 operates, the anolyte compartment 112 comprises an aqueous alkali (e.g. sodium) salt solution (NaX, wherein X comprises an anion capable of combining with a sodium cation to form a salt) and current is passed between an anode 118 and a cathode 120. Additionally, FIG. 1 shows that as the cell 110 operates, water ($H_2O$) can be split at the anode 118 to form oxygen gas ($O_2$) and protons ($H^+$) through the reaction $2H_2O \rightarrow O_2 + 4H^+ + 4e^-$. FIG. 1 further shows that the sodium salt NaX in the anolyte solution can be split (according to the reaction $NaX + H^+ \rightarrow HX + Na^+$) to: (a) allow sodium cations ($Na^+$) to be transported through the NaSICON membrane 116 into the catholyte compartment 114 and (b) to allow anions ($X^-$) to combine with protons to form an acid (HX) that corresponds to the original sodium salt. Similarly, FIG. 1 shows that as the cell 110 operates, water ($H_2O$) can be split at the cathode 220 to form hydrogen gas ($H_2$) and hydroxyl ions ($OH^-$) through the reaction $2H_2O + 2e^- \rightarrow H_2 + 2OH^-$. FIG. 1 further shows that the sodium cations transported through the NaSICON membrane 116 can combine with hydroxyl ions in the catholyte solution according to the reaction $OH^- + Na^+ \rightarrow NaOH$.

As electrochemical cells operate with the alkali ion-selective membrane exposed to adverse conditions, some such cells may have shortcomings. In one example, at a lower pH, such as a pH less than about 5, certain alkali ion-conductive ceramic membranes, such as NaSICON membranes, may become less efficient or unable to transport alkali cations. Accordingly, as the electrochemical cell operates and acid is produced in the anolyte compartment, the cell may become less efficient or even inoperable. In another example, acid produced in the anolyte compartment can actually damage the alkali ion-selective membrane, such as a NaSICON membrane, and thereby shorten its useful lifespan.

In other examples, electrochemical cells may be operated using catholyte and/or anolyte solutions (such as basic solutions; organic solutions; neutral solutions containing a detrimental ion, such as potassium, lithium or cesium, that effects membrane efficiency; etc.) that are chemically reactive to, or that otherwise damage or reduce the efficiency of, the alkali ion-conductive electrolyte membrane. While such solutions may be added directly to the cell, in some instances, the solutions are generated as the cell operates. For instance, where the cell comprises an organic solvent (e.g., ethylene glycol, hexanol, etc.), operation of the cell, especially at high voltages and for long periods of time) may cause the organic solvent to react and form a resistive film on the membrane and, thereby, reduce the cell's overall efficiency. Additionally, in some instances in which the cell comprises an organic compound (e.g., methanol), the organic compound evolves protons as the cell functions, which, in turn, can lower the pH of the solvent contacting the membrane. In still other instances in which the cell (e.g., a battery) comprises a fluorinated compound (e.g., $LiPF_6$) and even a trace amount of water, the cell may function to produce hydrofluoric acid (HF), and thereby reduce the pH of the materials in contact with the membrane. As discussed above, this reduction in the pH of materials contacting the membrane can cause the cell to be less efficient or even inoperable.

In yet other examples, electrochemical cells may be operated using molten metals, such as molten anode or cathode materials which may be chemically reactive to the alkali ion-conductive electrolyte membrane. In still other examples, the electrolytic cells may be operated using molten salts which may be chemically reactive to the alkali ion-conductive electrolyte membrane.

Thus, while electrochemical cells comprising a catholyte compartment and an anolyte compartment that are separated by an alkali ion-conductive membrane are known, challenges still exist, including those mentioned above. Accordingly, it would be an improvement in the art to augment or even replace current electrochemical cells with other cells or methods for using the cells. More specifically, it would be an improvement in the art to protect the alkali ion-conductive electrolyte membrane from undesired chemical reactions and thereby maintain its alkali ion conductivity.

BRIEF SUMMARY OF THE INVENTION

The present invention provides systems and methods for protecting an alkali ion-conductive electrolyte material when the material is used in an electrochemical cell having conditions that would attack, degrade, dissolve, corrode, reduce the efficiency of, or otherwise adversely affect the proper function of the material if it were not protected. In some instances, to protect the alkali ion-conductive material, the material comprises a composite alkali ion-conductive electrolyte membrane having a layer of one or more alkali compounds disposed on an anolyte and/or catholyte side of the alkali ion-conductive material.

The alkali ion-conductive electrolyte material may include, but is not limited to, an alkali Metal Super Ion Conductive (MeSICON) material, where "Me" represents an alkali metal. Non-limiting examples of MeSICON materials include NaSICON, NaSICON-type materials, LiSICON, LiSICON-type materials, KSICON, and KSICON-type materials.

The alkali compound can comprise any suitable characteristic that allows it to protect the alkali ion-conductive material from adverse conditions while allowing the material to selectively transport alkali ions. Accordingly, the alkali compound is capable of conducting alkali ions. The alkali compound of the present invention can be an alkali alloy, an intercalation compound or an intermetallic compound. The alkali compound of the present invention can be an alkali ion conductor or a mixed alkali ion/electronic conductor or an electronic conductor. Thus, while some non-limiting embodiments of the alkali compound (e.g., $NaMnO_2$, Na intercalated carbon or Na containing alloy) are electrically conductive, other non-limiting embodiments of the alkali compound (e.g., $NaAlO_2$, $NaFeO_2$) are electrically insulative. In some embodiments, the layer of alkali compound is also chemically stable upon exposure to the anolyte solution and/or catholyte solution thereby protecting the alkali ion-conductive material from unwanted chemical reaction. By way of non-limiting example, the alkali compound may be chemically stable in (or otherwise protect the alkali ion-conductive material): under acidic conditions, under basic conditions, in the presence of organic compounds, in the presence of pH neutral compounds having one or more chemicals (e.g., potassium) that are capable of adversely affecting the alkali ion-conductive material, in the presence of proton evolving compounds, in the presence of oxidizing chemicals, in the presence of energetic materials, in the presence of corrosive chemicals. in the presence of molten metals or molten salts, when exposed to organic salts dissolved in organic or ionic-liquid solvents, and/or under other conditions that would adversely affect the alkali ion-conductive material if the alkali compound were not present.

The alkali compound may comprise any suitable material or materials that allow it function in the manner described herein. Indeed, in some non-limiting embodiments, the intercalation compound is a carbon-based alkali intercalation compound. Non-limiting examples of carbon-based alkali intercalation compound include a graphite intercalation compound, meso-porous carbon, boron-doped diamond, graphene, and combinations thereof. In some non-limiting embodiments, the alkali compound comprises one or more alkali-containing intercalation electrode materials, which may include, but are not limited to, an alkali cobalt oxide ($MCoO_2$), an alkali iron phosphate ($MFePO_4$), an alkali manganese dioxide ($MMnO_2$), an alkali manganese oxide ($MMn_2O_4$), an alkali iron oxide ($MFeO_2$), and an alkali nickel oxide ($MNiO_2$), wherein M is an alkali metal (e.g., Na, Li, K, etc.). Additional, non-limiting examples of alkali-containing intercalation materials include birnessite (e.g., $(Na_{0.3}Ca_{0.1}K_{0.1})(Mn^{4+}, Mn^{3+})_2O_4 \cdot 1.5H_2O$)) and todorokite (e.g., $(Mn, Mg, Ca, Ba, K, Na)_2Mn_2O_{12} \cdot 3H_2O$).

In some non-limiting embodiments, the alkali compound comprises an alkali metal amalgam or alloy. In such embodiments, the alkali metal amalgam or alloy or intermetallic compound may comprise an alkali metal and metals known to form such amalgam or alloy or intermetallic compound from that specific alkali metal. For a first non-limiting example, when the alkali metal is sodium the metal may be selected from mercury, lead, zinc, tin, phosphorous and cadmium. For a second non-limiting example, when the alkali metal is lithium the metal may be selected from aluminum, silicon, germanium, phosphorous, bismuth, mercury, lead, and tin. The concentration of the alkali metal in the amalgam or alloy may range, in some non-limiting embodiments, from about 0.01 molar percent to about 10 molar percent.

In some non-limiting implementations, the composite alkali ion-conductive electrolyte membrane further includes one or more cation conductor layers that are resistant to acidic conditions, are resistant to basic conditions, or inert, or that are otherwise capable of protecting the alkali ion-conductive membrane. While the cation conductive layer can be disposed in any suitable location, in some non-limiting embodiments, the cation conductive layer (e.g., an acid resistant material, such as a NAFION® polymer) is disposed between the alkali ion-conductive material and the anode (e.g., between the alkali compound layer and the anode). In other non-limiting embodiments, however, the cation conductive layer (e.g., a base resistant material) is disposed between the alkali ion-conductive material and the cathode (e.g., between the intercalation layer and the cathode).

In some non-limiting implementations, the described electrochemical cell comprises an anolyte compartment and a catholyte compartment that are separated by the composite alkali ion-conductive electrolyte membrane. In some embodiments of the cell, the anolyte compartment comprises an anode that is positioned to contact an anolyte solution. Furthermore, in some embodiments, the catholyte compartment comprises a cathode that is positioned to contact a catholyte solution. The cell also comprises a power source that is capable of passing current between the anode and the cathode. In some embodiments, when the power source is used to pass current between the electrodes, the anolyte solution may become more acidic, the catholyte solution may become more basic, an organic resistive layer may form within the cell, or the operating conditions of the cell may otherwise become increasingly adverse to the proper functioning of the alkali ion-conductive material—that is, if the material were not protected by the alkali compound layer.

While the described components, systems, and methods are particularly useful for separating an alkali metal (e.g., sodium) from mixed alkali salts, for producing acids that correspond to alkali (e.g., sodium) salts, and for producing alkali hydroxide, the skilled artisan will recognize that the described components, systems, and methods can be modified to be used for a variety of electrochemical processes in which the alkali ion-conductive membrane is subjected to conditions that are generally outside of those considered to be safe or optimal for the use of MeSICON-type conductive membranes (e.g., basic conditions; conditions involving neutral organic solutions comprising chemicals, such as potassium, that may adversely affect the membrane; etc.). In such processes, the alkali compound is chemically stable upon exposure to such reactive conditions or chemically reactive species or otherwise provides added protection to the alkali ion-conductive electrolyte material.

Although some examples disclosed herein refer to sodium and NaSICON-type membranes, it will further be appreciated that the apparatus and methods within the scope of the present invention may be used in relation to other alkali metals besides sodium. For example, instead of using an electrochemical cell that includes a NaSICON membrane and an anolyte solution with a sodium salt (NaX), the described systems and methods may be used with any other suitable alkali salt (e.g., LiX, KX, etc.) or alkali containing material and with any other suitable alkali-cation-conductive membrane (e.g., a LiSICON membrane, a KSICON membrane, etc.) that is capable of transporting cations (e.g., $Li^+$, $K^+$, etc.) from the anolyte compartment to the catholyte compartment.

While the described systems are shown with the composite alkali ion-conductive electrolyte membrane oriented vertically, it will be understood that the composite electrolyte membrane may be oriented horizontally or in any other suitable configuration or orientation. Additionally, while the composite alkali ion-conductive electrolyte membrane is generally described herein as being used in an electrolytic cell, the membrane can be used in any other suitable electrochemical cell in which the alkali compound layer can be used to protect the alkali ion-conductive material from conditions that would otherwise be adverse to the functioning of the ion-conductive material. Some non-limiting examples of such electrochemical cells include batteries and fuel cells.

The electrolytic cell of the present invention may be used with alkali metals and acids corresponding to the alkali salts used in the anolyte. Moreover, it will be appreciated that other electrolytic reactions may occur which result in proton formation and corresponding lowering of pH within the anolyte compartment, that the electrolytic cell of the present invention can be used to solve this problem. The electrolytic cell of the present invention can be used with a wide variety of chemicals and components, including, without limitation, aqueous solvents, organic solvents, neutral solvents, ionic-liquid solvent media, molten salts, solid or molten electrodes, and a number of other conventional components and chemicals.

The electrochemical cells comprising alkali ion-selective membranes (as described herein) may be used in a variety of other applications, including for the production of a variety of different chemicals, to perform various chemical processes, and in energy storage devices (such as batteries). By way of example, some electrochemical cells of the present invention may be used: (1) to convert alkali salts into their corresponding acids (e.g., to produce hydrochloric acid from sodium chloride brine), (2) to separate alkali metals from mixed alkali salts (e.g., to separate sodium ions from a solution containing other metal (e.g., Li, K, Mg, Ca, Al, Fe, Ni, etc.) salts), (3) to produce oxidizing chemicals (e.g., sodium hypohalite, halogen dioxide, ozone, sodium halite, etc.) in an anode compartment, (4) to produce energetic compounds (e.g., sodium methoxide or sodium metal) in a cathode compartment, (5) as primary or secondary batteries based on alkali metals (e.g., a battery containing a sodium metal anode, a sodium manganese oxide interaction cathode, etc.), and (6) to decarboxylate alkali carboxylate in organic solvents (e.g., to produce octane from sodium valerate).

In each of the above-mentioned applications, the alkali ion-selective membrane of the present invention is expected to perform stably, even when subjected to one or more adverse conditions. For example, in some applications, the alkali ion-selective membrane may need to continue transporting specific alkali ions: (1) under acidic conditions; (2) under basic conditions; (3) under neutral conditions comprising a material, such as potassium, that may reduce the efficiency of the membrane; (4) in the presence of oxidizing chemicals, such as halogens, chlorate, etc.; (5) in the presence of energetic materials, such as alkali methoxides, alkali metals (molten or solid) on the membrane surface facing the cathode; (6) in the presence of energetic materials, such as alkali metals (molten or solid) on the membrane surface facing the anode; (7) in the presence of organic compounds and salts, such as sodium carboxylates, dissolved in organic or ionic-liquid solvents; or under other conditions that typically tend to corrode, deactivate, or otherwise adversely affect the membrane.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

Figure 6:
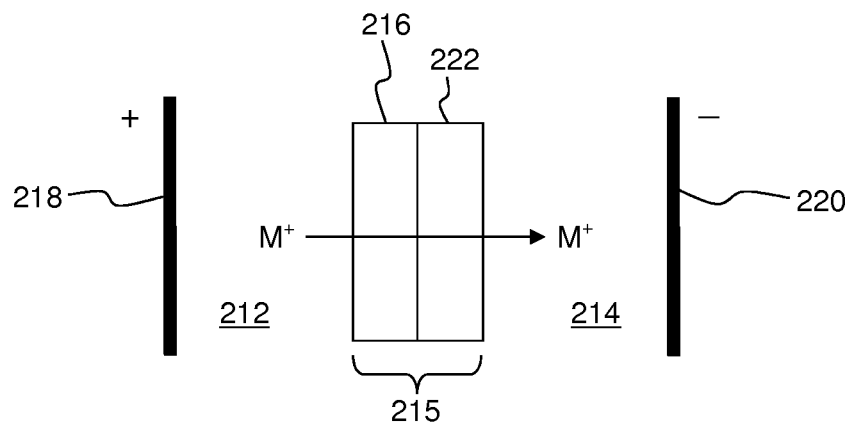
Figure 7:
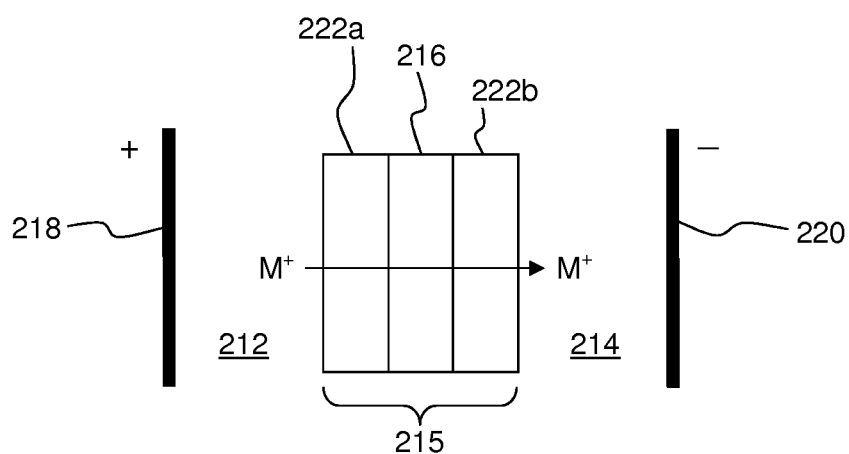

FIG. 6 depicts a schematic diagram of a representative embodiment of the electrochemical cell in which a layer of the alkali compound is disposed on the catholyte side of the alkali ion-conductive electrolyte membrane; and FIG. 7 depicts a schematic diagram of a representative embodiment of an electrochemical cell in which layers of the alkali compound are disposed on both sides of the alkali ion-conductive electrolyte membrane.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable alkali ion-conductive electrolyte membranes, alkali intercalation compounds, anolyte solutions, catholyte solutions, electrochemical cells, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention relates to systems and methods for protecting an alkali ion-conductive electrolyte material when the material is used in an electrochemical cell (e.g., an electrolytic cell) having reactive conditions or chemically reactive species that would attack, degrade, dissolve, corrode, deactivate, reduce the efficiency of, or otherwise have an adverse effect on the material if the material were not properly protected. To protect the material, the material comprises a composite alkali ion-conductive electrolyte membrane which has one or more layers of an alkali compound disposed on one or both sides of the alkali ion-conductive material. In this regard, the alkali compound is chemically stable upon exposure to such reactive conditions or chemically reactive species and is otherwise capable of protecting the alkali ion-conductive electrolyte membrane from chemical reaction, degradation, and other effects of adverse conditions.

In some non-limiting examples, electrochemical (e.g., electrolytic) cells may be operated under acidic conditions in the anolyte compartment. In other non-limiting examples, electrochemical cells may be operated using catholyte and/or anolyte solutions (e.g., basic solutions; solutions containing organic compounds, oxidizing chemicals, energetic materials, and/or organic salts; neutral solutions comprising membrane-inhibiting chemicals, such as potassium; proton evolving compounds; etc.) that are chemically reactive to or that would otherwise adversely affect the alkali ion-conductive electrolyte material. This may result from chemical species dissolved in the solvent, from the solvent itself, or from chemical species that are formed as the cell functions. In yet other non-limiting examples, electrolytic cells are operated using molten metals, such as molten anode or cathode materials which may be chemically reactive to the alkali ion-conductive electrolyte material. In still other non-limiting examples, the electrolytic cells are operated using molten salts which may be chemically reactive to the alkali ion-conductive electrolyte material. To provide a better understanding of the described systems and methods, a non-limiting embodiment of an electrochemical cell is first described, followed by a description of a variety of methods for using the cell.

Figure 1:
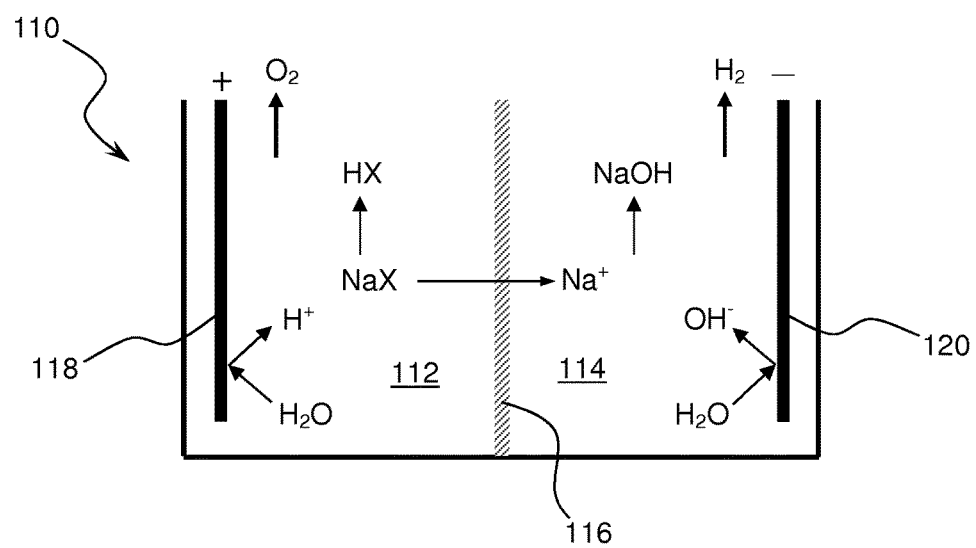
FIG. 1 depicts a schematic diagram of an embodiment of a prior art electrolytic cell comprising a cation-conductive membrane.
Figure 2:
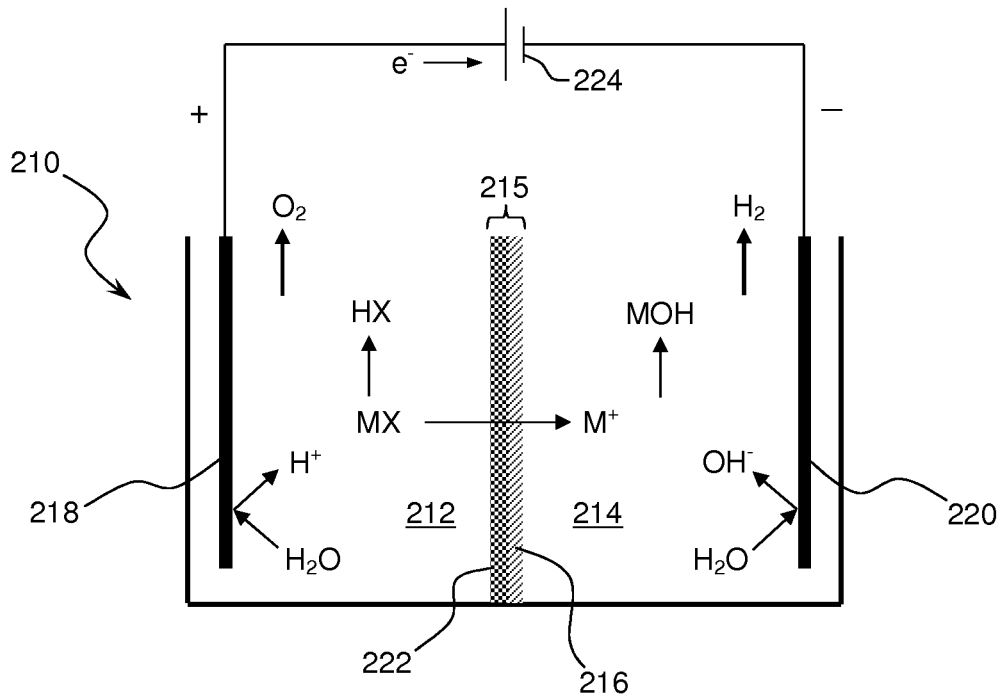
FIG. 2 depicts a schematic diagram of a representative embodiment of an electrochemical cell comprising a composite alkali ion-conductive electrolyte membrane.

The electrochemical cell can comprise any suitable component that allows it to produce a desired chemical product. By way of non-limiting illustration, FIG. 2 illustrates a representative embodiment in which an electrochemical cell (e.g., an electrolytic cell) 210 comprises an anolyte compartment 212 and a catholyte compartment 214 that are separated by composite alkali ion-conductive electrolyte membrane 215. FIG. 2 further shows that while, in some embodiments, the anolyte compartment 212 houses an anode electrode 218 that is positioned to contact an anolyte solution or anolyte, in some embodiments, the catholyte compartment 214 comprises a cathode electrode 220 that is positioned to contact a catholyte solution or catholyte.

Moreover, FIG. 2 shows that the composite electrolyte membrane 215 includes an alkali ion-conductive electrolyte material 216 and a layer comprising an alkali compound 222. In this particular embodiment, FIG. 2 also shows that the alkali compound 222 is disposed between the alkali ion-conductive material 216 and the anode 218. While not shown in FIG. 2, the alkali compound 222 can alternatively, or in addition, be disposed between the alkali ion-conductive material 216 and the cathode 220.

With respect to the alkali ion-conductive electrolyte material 216, that material can comprise any alkali Metal Super Ion Conductive (MeSICON) material that is suitable for use in an electrochemical cell and which can be protected from adverse conditions (e.g., acidic conditions, basic conditions, molten electrodes, etc.) by the alkali compound 222 (discussed below). Non-limiting examples of suitable MeSICON materials include NaSICON, NaSICON-type materials, LiSICON, LiSICON-type materials, KSICON, and KSICON-type materials.

The alkali compound 222 is selected to protect the alkali ion-conductive material 216 from chemical species and conditions that would otherwise be adverse to the membrane. Indeed, in some non-limiting embodiments, the compound is selected to be chemically stable in, or to otherwise protect the alkali ion-conductive material from, acidic conditions, basic conditions, neutral conditions (e.g., in a solution comprising potassium), molten metal (e.g., a molten anode or cathode) or molten salt (e.g., a molten electrolyte), an organic compound or products thereof, and/or other chemical species or conditions that would otherwise adversely affect the proper function of the alkali ion-conductive material. By way of non-limiting example, by being stable or tolerant to acidic conditions, the alkali compound 222 is able to protect the alkali ion-conductive material 216 from acid produced in the cell (e.g., in the anolyte solution). In other non-limiting example, by being stable or tolerant to basic conditions, the layer of alkali compound 222 is able to protect the alkali ion-conductive material 216 from bases produced in the cell (e.g., in the catholyte solution).

The alkali compound 222 can comprise any suitable material that allows it to provide increased protection to the alkali ion-conductive material and that is readily conductive to alkali metal ions to allow the alkali ion-conductive material to function as intended. Some non-limiting examples of suitable alkali compounds include one or more carbon-based alkali intercalation compounds, alkali-containing intercalation electrode materials, alkali metal amalgams or alloys or intermetallic compounds, or a combination thereof.

Some non-limiting examples of carbon-based alkali intercalation compound include one or more graphite intercalation compounds, meso-porous carbon, boron-doped diamond, and graphene, which is an allotrope of carbon. In this regard, the carbon-based intercalation compound (e.g., graphene) can be applied to the alkali ion-conductive material in any suitable manner, including, without limitation, through the use of chemical vapor deposition.

Non-limiting examples of alkali-containing intercalation electrode materials include an alkali cobalt oxide ($MCoO_2$), an alkali iron phosphate ($MFePO_4$), an alkali manganese dioxide ($MMnO_2$), an alkali manganese oxide ($MMn_2O_4$), an alkali iron oxide ($MeFeO_2$), and an alkali nickel oxide ($MNiO_2$), wherein M is an alkali metal (e.g., Na, Li, K, etc.). These compounds are based upon analogous compounds used as cathode electrode materials in lithium ion batteries.

Moreover, the alkali iron phosphate compound is not limited to iron-containing compounds, but includes other transition metals, such as Co, Mn, Ti, etc. Some additional non-limiting examples of alkali-containing intercalation materials also include birnessite (e.g., $(Na_{0.3}Ca_{0.1}K_{0.1})(Mn^{4+}, Mn^{3+})_2O_4 \cdot 1.5H_2O)$) and todorokite (e.g., $(Mn, Mg, Ca, Ba, K, Na)_2Mn_2O_{12} \cdot 3H_2O$).

In some non-limiting embodiments, the alkali compound comprises an alkali metal amalgam or alloy. In such embodiments, the alkali metal amalgam or alloy or intermetallic compound may comprise an alkali metal and metals known to form such amalgam or alloy or intermetallic compound from that specific alkali metal. For a first non-limiting example, when the alkali metal is sodium the metal may be selected from mercury, lead, zinc, tin, phosphorous and cadmium. For a second non-limiting example, when the alkali metal is lithium the metal may be selected from aluminum, silicon, germanium, phosphorous, bismuth, mercury, lead, and tin.

Non-limiting examples of an alkali metal amalgam or alloy include a composition comprising an alkali metal and one or more other metals selected from mercury, lead, zinc, tin, and cadmium. One non-limiting example of an alkali metal amalgam or alloy is a sodium/mercury amalgam. Mercury amalgams are stable in dilute acid environments, including, but not limited to, dilute hydrochloric and sulfuric acids. Additionally, the concentration of the alkali metal in the amalgam or alloy can be in any suitable range that allows the amalgam or alloy to perform its intended functions. Indeed, in some embodiments, the concentration of the alkali metal in the amalgam or alloy is between about 0.01 molar percent and about 0.5 molar percent.

In addition to being ion conductive, the intercalation compound 222 can have any other characteristic that allows it to function as intended. For instance, while some non-limiting embodiments of the intercalation compound (e.g., $MMnO_2$, where M is an alkali metal) are electrically conductive, in other non-limiting embodiments, the compound (e.g., $MFeO_2$, where M is an alkali metal) is electrically insulating.

FIG. 2 also shows that in some non-limiting embodiments the cell 210 comprises a power source 224 that is capable of passing current between the anode 218 and both the cathode 220. Generally, as current passes between the electrodes, alkali metal ions ($M^+$) pass through the composite electrolyte membrane 215. In other words, as the cell functions, the composite electrolyte membrane 215 continues to function even when exposed to adverse conditions (e.g., acidic conditions, basic conditions, etc.). As used herein, acidic conditions include pH values below about 7, more specifically below about 5. From a practical operating standpoint, however, the acidic conditions may have a pH greater than 1, and in some cases a pH greater than 2, and in other cases a pH greater than 3. Additionally, as used herein, the term basic conditions may include pH values above about 7, and more particularly above about 9.

Figure 3:
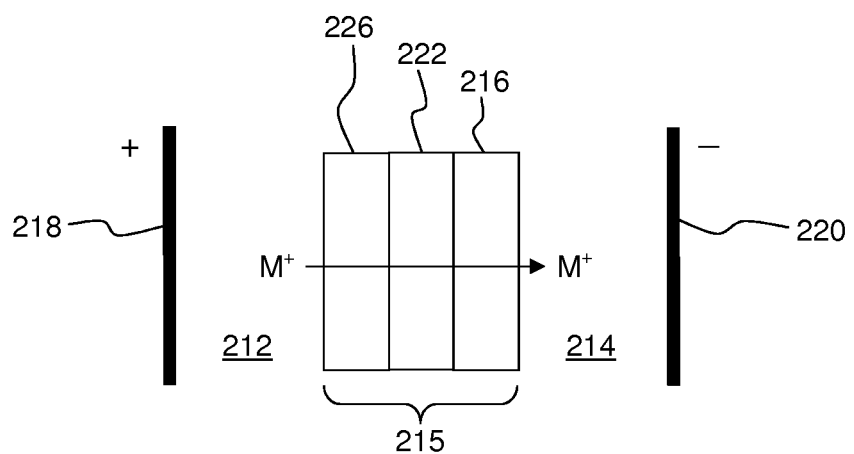
FIG. 3 depicts a schematic diagram of a representative embodiment of the composite alkali ion-conductive electrolyte membrane.

In some non-limiting embodiments, the composite electrolyte membrane 215 optionally includes a cation conductor layer 226, as shown in FIG. 3. In this regard, the cation conductor layer 226 is made of a chemically resistant material that is conductive to alkali cations. For example, the cation conductor layer 226 may comprise an acid resistant material, a base resistant material, an inert material, or a material that is otherwise capable of providing additional protection against chemically reactive species and adverse cell conditions. While the cation conductor layer can comprise any suitable material that allows it to provide additional protection to the composite electrolyte membrane, one non-limiting example of a suitable cation conductor layer is a NAFION® membrane, produced by DuPont, or similar polymeric membrane.

Where the cell 210 comprises the cation conductor layer 226, that layer can be disposed in any suitable location that allows it to provide additional protection to the alkali ion-conductive material 216. In some non-limiting embodiments, the cation conductive layer (e.g., an acid resistant material) is disposed between the alkali ion-conductive material and the anode 218 (e.g., between the alkali compound layer 222 and the anode). Thus, in such embodiments, the cation conductor layer 226 provides additional protection against acidic operating conditions and may permit the composite electrolyte membrane 215 to function properly under acidic pH conditions, such as a pH of about 1 or 2. In other non-limiting embodiments (not shown), the cation conductor layer (e.g., a base resistant material) is disposed between the alkali ion-conductive material and the cathode 220 (e.g., between the intercalation layer and the cathode). In still other embodiments, the cation conductor layer is disposed on both the anolyte side and the catholyte side of the alkali ion-conductive material (e.g., between a first layer of the intercalation compound and the anode and between a second layer of the interaction and the cathode).

With respect to the anode electrode 218, the anode can comprise one or more of a variety of materials that allow it to initiate a desired electrolytic reaction at the anode 218 when the anode is contacted with an anolyte and when current is running between the anode 218 and the cathode 220. Indeed, in some non-limiting embodiments, the anode optionally comprises a material that allows the anode to evolve protons ($H^+$) when the anode contacts an aqueous anolyte solution and as the cell functions. Some non-limiting examples of suitable anode materials comprise dimensionally stabilized anode (DSA), platinized titanium, ruthenium (IV) dioxide ($RuO_2$), graphite, stainless steel alloys, and other suitable known or novel anode materials. Furthermore, in some non-limiting embodiments, the anode comprises a molten metal (e.g., sodium, lithium, etc.).

The cathode electrode 220 can comprise any suitable material that allows it to be stable in the catholyte solution and to initiate a desired electrolytic reaction when current passes between the cathode and the anode. Some non-limiting examples of suitable materials that can be used in the cathode include nickel, stainless steel alloys, graphite, titanium, a nickel-cobalt-ferrous alloy (e.g., a KOVAR® alloy), and other known or novel cathode materials. Additionally, in some non-limiting embodiments, the cathode comprises an electro-catalyst, such as platinum, that increases the cathode's ability to evolve hydrogen. By way of non-limiting example, the cathode may comprise platinized nickel, platinized titanium, and/or other suitable electro-catalyst materials. Furthermore, in some non-limiting embodiments, the cathode may comprise a molten metal.

With regard to the anolyte solution in the anolyte compartment 212, the anolyte can initially comprise virtually any solution that allows the anode 218 to initiate one or more other desired electrochemical reactions (e.g., to evolve protons; to function as a battery, electrolytic cell, fuel cell; etc.) when current passes between the anode and the primary cathode 220 and/or second cathode. In some non-limiting embodiments, however, the anolyte comprises an alkali-salt solution, including, but not limited to, an aqueous alkali-salt solution. For instance, where the cation-conductive membrane comprises a NaSICON-type membrane, the anolyte can comprise a sodium salt (NaX), which may include, but is not limited to, sodium lactate ($NaC_3H_5O_3$), sodium sulfate ($Na_2SO_4$), and/or sodium chloride (NaCl). Similarly, when the cation-conductive membrane comprises a LiSICON membrane or a KSICON membrane, the anolyte can respectively comprise any suitable lithium salt (LiX) or potassium salt (KX), including, but not limited to, lithium or potassium salts corresponding to the sodium salts mentioned above. In still other non-limiting embodiments, the anolyte comprises one or more oxidizing chemicals (e.g., a halogen, chlorate, etc.), energetic materials (e.g., alkali methoxides, alkali metals (molten or solid); organic compounds (e.g., methanol, hexanol, ethylene glycol, etc.); neutral solutions comprising potassium or another chemical that may adversely affect a naked alkali ion-conductive material; organic salts (e.g., sodium carboxylate dissolved in organic or ionic-liquid solvents); electrolytes (e.g., $LiPF_6$ (e.g., where the cell comprises a battery)) and/or any other chemical that may be useful in the anolyte.

The catholyte solution can comprise virtually any solution that allows the primary cathode 220 to cause a desired electrochemical reaction (e.g., the evolution of hydroxide ions; to function as a battery, fuel cell, electrolytic cell; etc.) to occur when the catholyte is in contact with the primary cathode and when current passes between the anode 218 and the primary cathode. In some non-limiting embodiments, however, the catholyte solution comprises, but is not limited to, water, an aqueous alkali-salt solution, a hydroxide solution (e.g., an alkali hydroxide), an organic solution (such as an alcohol, methanol, hexanol, ethylene glycol), an alkali base, a molten salt, an oxidizing chemical (e.g., a halogen, chlorate, etc.), an energetic material (e.g., an alkali methoxide; and alkali metal (molten or solid); a neutral solution comprising potassium or another chemical that may adversely affect a naked alkali ion-conductive material; an organic salt (e.g., sodium carboxylate dissolved in organic or ionic-liquid solvents); an electrolyte (e.g., $LiPF_6$), and/or any other chemical that may be useful in the catholyte. By way of non-limiting example, where the alkali ion-conductive membrane comprises a NaSICON membrane, the catholyte solution can comprise an aqueous sodium chloride solution, an aqueous sodium hydroxide solution, a sodium methylate solution, etc. Similarly, where the alkali ion-conductive membrane comprises a LiSICON membrane, the catholyte solution may comprise an aqueous solution of lithium chloride, lithium hydroxide, etc. Moreover, where the cation-conductive membrane comprises a KSICON membrane, the catholyte solution may comprise an aqueous solution of potassium chloride, potassium hydroxide, etc.

While not shown in FIG. 2, the various compartments of the electrochemical cell 210 may also comprise one or more fluid inlets and/or outlets. In some embodiments, the fluid inlets allow specific chemicals and fluids to be added to one or more desired places within the cell. In other embodiments, the fluid inlets and outlets may allow fluids to flow through one or more compartments or spaces in the cell.

The described electrochemical cell 210 may function to produce a wide range of chemical products, including, but not limited to, acids that correspond to alkali bases, substantially pure alkali metals, chlorine-based oxidant products, oxygen, chlorine, hydrogen, biofuels, and/or a variety of other chemical products. In one non-limiting example, the described cell is used to obtain one or more acids corresponding to alkali salts and/or to obtain one or more alkali metals. For instance, while the described cell can use a sodium salt to produce an acid and/or to obtain sodium, the skilled artisan will recognize that cell can be used to produce acids, alkali metals, and electrochemical products from another alkali salt, such as a lithium salt or a potassium salt.

In one non-limiting example, FIG. 2 shows that where the anolyte solution comprises a alkali metal salt (MX) (including, but not limited to, an alkali metal lactate ($MC_3H_5O_3$), an alkali metal sulfate ($M_2SO_4$), and/or an alkali metal chloride (MCl)), the salt can be disassociated in the anolyte compartment 212 into the salt's cation ($M^+$) and its anion ($X^-$) (e.g., $C_3H_5O_3^-$, $SO_4^{-2}$, $Cl^-$, etc.). FIG. 2 illustrates that the cation ($M^+$) from the salt (MX) may react with protons ($H^+$) evolved from the anode 218 to form an acid (HX) (e.g., lactic acid ($C_3H_6O_3$), hydrochloric acid (HCl), etc.) that corresponds to the original alkali metal salt (MX). FIG. 2 further illustrates that the alkali metal ion ($M^+$) is selectively transported through the composite alkali ion-conductive electrolyte membrane 215 into the catholyte compartment 214, where it can be collected (e.g., as alkali metal hydroxide, or in some other suitable form). Additionally, in this example FIG. 2 illustrates that oxygen gas ($O_2$) can be vented and/or collected from the anolyte compartment 212 and that hydrogen gas ($H_2$) can be vented and/or collected from the catholyte compartment 214.

The alkali compound 222 is selected to be conductive of the alkali metal ion. Without being bound by theory, in one non-limiting embodiment, the alkali metal ion ($M^+$) passes directly through the alkali compound 222.

In another non-limiting embodiment, alkali metal ions do not pass directly through the alkali compound 222. Instead, alkali metal ions are reduced at an anode side of the alkali compound 222 and pass through the alkali compound 222 as the reduced alkali metal, and the alkali metal is oxidized at the cathode side of the alkali compound 222 to form alkali metal ions, which are conducted through the alkali ion-conductive material 216.

Figure 4:
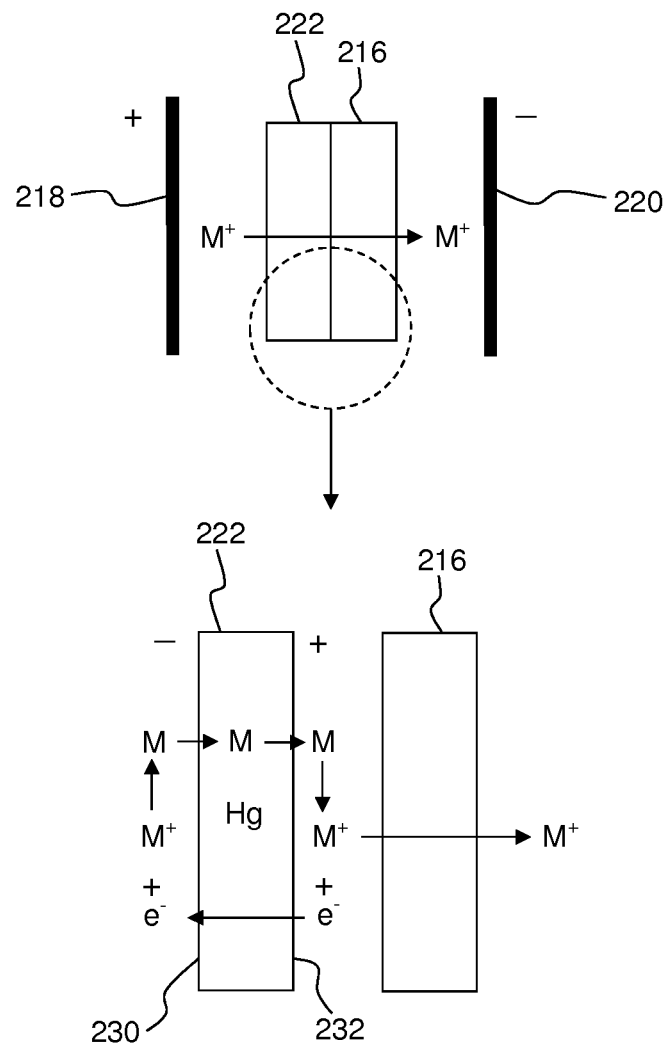
FIG. 4 depicts a schematic diagram of a representative embodiment of an alkali metal amalgam or alloy functioning as a bipolar electrode.

Without being bound by theory, in some non-limiting embodiments, the alkali compound 222 may function as a bipolar electrode. FIG. 4 depicts a schematic diagram of a representative embodiment of an alkali compound 222 functioning as a bipolar electrode. In this embodiment, the alkali compound 222 is shown as an amalgam of mercury and the alkali metal. The anode side 230 of the compound 222 becomes negatively charged, and the cathode side 232 of the compound 222 becomes positively charged. Accordingly, the anode side 230 can function as a cathode to reduce alkali metal ions according to the reaction $M^+ + e^- \rightarrow M$. The alkali metal M can enter the compound 222. The cathode side 232 can function as an anode to oxidize the alkali metal to form alkali metal ions according to the reaction $M \rightarrow M^+ + e^-$. Free electrons can pass between the cathode side 232 and the anode side 230 as shown. The alkali metal ion formed on the cathode side 232 of the compound 222 is available to pass through the alkali ion-conductive material 216.

Figure 5:
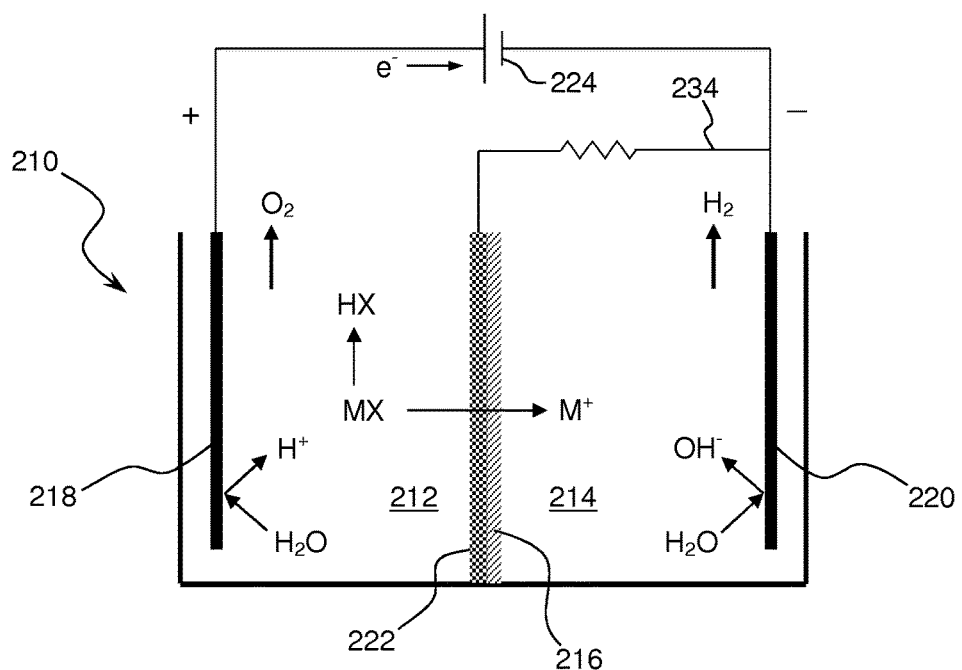
FIG. 5 depicts a schematic diagram of a representative embodiment of the electrochemical cell comprising the composite alkali ion-conductive electrolyte membrane, wherein an alkali compound is configured to function as a secondary cathode.

In another non-limiting embodiment, the alkali compound 222 may function as a secondary cathode. Examples of this feature are disclosed in U.S. patent application Ser. No. 13/269,412, which is incorporated by reference. FIG. 5 depicts a schematic diagram of a representative embodiment of the electrochemical cell 210 comprising the composite alkali ion-conductive electrolyte membrane and in which the alkali compound 222 is configured to function as a secondary cathode. In this embodiment, a small portion of the current 234 from the power source 224 which drives the cathode 220 is split and electrically coupled to the alkali compound 222. This current reduces alkali metal ions according to the reaction $M^+ + e^- \rightarrow M$. The alkali metal M can enter and pass through the compound 222.

While the foregoing disclosure shows the layer of alkali compound 222 exposed to the anolyte side of the electrochemical cell 210, it will be understood that in some embodiments, including the embodiment shown in FIG. 6, the alkali compound 222 may be exposed to the catholyte side of the electrochemical cell to protect the alkali ion-conductive electrolyte material 216 from reactive conditions in the catholyte compartment 214.

In other non-limiting embodiments, the composite alkali ion-conductive electrolyte membrane 215 may contain a layer of the alkali compound 222 exposed to both the anolyte side and catholyte side of the electrochemical cell 210. By way of illustration, FIG. 7 illustrates a representative embodiment in which the composite alkali ion-conductive electrolyte membrane 215 comprises a layer of alkali compound 222a exposed to the anolyte compartment 212 and a layer of alkali compound 222b exposed to the catholyte compartment 214.

It will be appreciated that the described systems and methods used a composite alkali ion-conductive electrolyte membrane under certain reactive conditions or adverse conditions (e.g., acidic conditions; basic conditions; neutral conditions comprising a material such as potassium; conditions in which the cell comprises a proton evolving compound, an organic compound, a molten metal, a molten salt, or other chemically reactive species; etc.). Accordingly, the described systems and methods allow the electrolytic cell to efficiently produce desired chemical products without damaging the alkali ion-conductive material to the same extent as would occur if the alkali compound were not used. The alkali compound provides chemical protection to the alkali ion conductive material thereby permitting it to function under adverse conditions.

In addition to the aforementioned components and characteristics of the described systems and methods, the cell 210 can be modified in any suitable manner that allows ions to be selectively transported through the alkali ion-conductive electrolyte material 216 as the cell functions. In one non-limiting example, while the described systems are shown with the composite alkali ion-conductive electrolyte membrane 215 oriented vertically, it will be understood that the composite electrolyte membrane may be oriented horizontally or in any other suitable configuration or orientation. In another non-limiting example, while the composite alkali ion-conductive electrolyte material is described herein as being used in an electrolytic cell 210, the composite alkali ion-conductive material can be used in any other suitable electrochemical cell in which an alkali layer 222 can protect the alkali ion-conductive material from conditions that would adversely affect the function of the material if the intercalation layer were not present. Some non-limiting examples of such electrochemical cells include batteries and fuel cells. Accordingly, the described composite alkali ion-conductive electrolyte membrane can be used to facilitate virtual any electrochemical reaction requiring a MeSICON material.

While specific embodiments and examples of the present invention have been illustrated and described, numerous modifications come to mind without significantly departing from the spirit of the invention, and the scope of protection is only limited by the scope of the accompanying claims.

The invention claimed is:

1. A method for operating an electrochemical cell, the method comprising:
   providing the electrochemical cell, the cell comprising:
   an anolyte compartment for holding an anolyte solution, the anolyte compartment comprising an anode positioned to contact the anolyte solution;
   a catholyte compartment for holding a catholyte solution, the catholyte compartment comprising a cathode positioned to contact the catholyte solution; and
   a composite alkali ion-conductive electrolyte membrane positioned between the anolyte compartment and the catholyte compartment, wherein the composite electrolyte membrane comprises:
   a layer of alkali ion-conductive material, wherein the alkali ion-conductive membrane comprises an alkali Metal Super Ion Conductive (MeSICON) material selected from NaSICON or NaSICON-type materials, LiSICON or LiSICON-type materials, and KSICON or KSICON-type materials; and
   a layer of alkali compound consisting of a carbon-based alkali intercalation compound which is electrically or ionically conductive and which is chemically stable upon exposure to the anolyte solution or catholyte solution thereby protecting the layer of alkali ion-conductive material from unwanted chemical reaction, and wherein the layer of alkali compound conducts alkali ions;
   adding the alkali ion containing catholyte solution to the catholyte compartment and the alkali ion containing anolyte solution to the anolyte compartment; and
   passing a current between the anode and the cathode.

2. The method of claim 1, wherein the carbon-based alkali intercalation compound is selected from a graphite intercalation compound, meso-porous carbon, boron-doped diamond, and graphene.

3. A method for operating an electrochemical cell, the method comprising:
   providing the electrochemical cell, the cell comprising:
   an anolyte compartment for holding an anolyte solution, the anolyte compartment comprising an anode positioned to contact the anolyte solution;
   a catholyte compartment for holding a catholyte solution, the catholyte compartment comprising a cathode positioned to contact the catholyte solution; and
   a composite alkali ion-conductive electrolyte membrane positioned between the anolyte compartment and the catholyte compartment, wherein the composite electrolyte membrane comprises:
   a layer of alkali ion-conductive material, wherein the alkali ion-conductive membrane comprises an alkali Metal Super Ion Conductive (MeSICON) material selected from NaSICON or NaSICON-type materials, LiSICON or LiSICON-type materials, and KSICON or KSICON-type materials; and
   a layer of alkali compound consisting of an alkali-containing intercalation electrode material which is electrically or ionically conductive and which is chemically stable upon exposure to the anolyte solution or catholyte solution thereby protecting the layer of alkali ion-conductive material from unwanted chemical reaction, and wherein the layer of alkali compound conducts alkali ions;
   adding the alkali ion containing catholyte solution to the catholyte compartment and the alkali ion containing anolyte solution to the anolyte compartment; and
   passing a current between the anode and the cathode.

4. The method of claim 3, wherein the alkali-containing intercalation electrode material comprises an alkali cobalt oxide ($MCoO_2$).

5. The method of claim 3, wherein the alkali-containing intercalation electrode material comprises an alkali iron phosphate ($MFePO_4$).

6. The method of claim 3, wherein the alkali-containing intercalation electrode material comprises an alkali manganese oxide ($MMn_2O_4$).

7. A method for operating an electrochemical cell, the method comprising:
provide the electrochemical cell, the cell comprising:
an anolyte compartment for holding an anolyte solution, the anolyte compartment comprising an anode positioned to contact the anolyte solution;
a catholyte compartment for holding a catholyte solution, the catholyte compartment comprising a cathode positioned to contact the catholyte solution; and
a composite alkali ion-conductive electrolyte membrane positioned between the anolyte compartment and the catholyte compartment, wherein the composite electrolyte membrane comprises:
a layer of alkali ion-conductive material, wherein the alkali ion-conductive membrane comprises an alkali Metal Super Ion Conductive (MeSICON) material selected from NaSICON or NaSICON-type materials, LiSICON or LiSICON-type materials, and KSICON or KSICON-type materials; and
a layer of alkali compound consisting of an alkali metal amalgam or alloy which is electrically or ionically conductive and which is chemically stable upon exposure to the anolyte solution or catholyte solution thereby protecting the layer of alkali ion-conductive material from unwanted chemical reaction, and wherein the layer of alkali compound conducts alkali ions;
adding the alkali ion containing catholyte solution to the catholyte compartment and the alkali ion containing anolyte solution to the anolyte compartment; and
passing a current between the anode and the cathode.

8. The method of claim 7, wherein the alkali metal amalgam or alloy comprises an alloy of phosphorous and an alkali metal.

9. The method of claim 7, wherein the alkali metal amalgam or alloy comprises an alloy of aluminum and an alkali metal.

10. The method of claim 7, wherein the alkali metal amalgam or alloy comprises an alkali metal and one or more other metals selected from silicon, germanium, lead, zinc, bismuth, tin, and cadmium.

11. The method of claim 7, wherein the composite electrolyte membrane further comprises an acid resistant cation conductor layer disposed between the alkali metal amalgam or alloy and the anode, or between the alkali metal amalgam or alloy and the cathode.

12. The method of claim 11, wherein the cation conductor layer comprises a NAFION® polymer membrane.

* * * * *